(12) United States Patent
Honnorat et al.

(10) Patent No.: US 12,227,289 B2
(45) Date of Patent: Feb. 18, 2025

(54) ROTORCRAFT PROVIDED WITH AN AIRFRAME CARRIED BY A SKID LANDING GEAR WITH ZONES FOR TAKING UP VARIABLE FORCES

(71) Applicant: AIRBUS HELICOPTERS, Marignane (FR)

(72) Inventors: Olivier Honnorat, Aix en Provence (FR); Nicolas Genelot, Coudoux (FR); Jérôme Benausse, La Verdiere (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/396,597

(22) Filed: Dec. 26, 2023

(65) Prior Publication Data

US 2024/0326991 A1 Oct. 3, 2024

(30) Foreign Application Priority Data

Mar. 30, 2023 (FR) ...................... 2303075

(51) Int. Cl.
  *B64C 25/52* (2006.01)
  *B64C 25/32* (2006.01)
(52) U.S. Cl.
  CPC ........ *B64C 25/52* (2013.01); *B64C 2025/325* (2013.01)
(58) Field of Classification Search
  CPC .......................... B64C 25/52; B64C 2025/325
  See application file for complete search history.

(56) References Cited

U.S. PATENT DOCUMENTS

| 3,173,632 A | 3/1965 | Woods |
| 3,857,533 A * | 12/1974 | Mason .................... B64C 25/52 180/41 |
| 4,270,711 A * | 6/1981 | Cresap .................... B64C 25/52 244/108 |

(Continued)

FOREIGN PATENT DOCUMENTS

| CN | 106347638 A | 1/2017 |
| FR | 2554210 A1 | 5/1985 |

(Continued)

OTHER PUBLICATIONS

French Search Report for French Application No. FR2303075, Completed by the French Patent Office, Dated Oct. 6, 2023, 16 pages.

*Primary Examiner* — Joshua J Michener
*Assistant Examiner* — Michael B. Kreiner
(74) *Attorney, Agent, or Firm* — BROOKS KUSHMAN P.C.

(57) ABSTRACT

A rotorcraft provided with a rotary wing and a skid landing gear, the landing gear being provided with a first skid and a second skid and with a first cross-member and a second cross-member. The first cross-member is connected to an airframe of the rotorcraft only by two fastenings. The second cross-member is only carried during flight by two supports fastened to the airframe and traversed by the second cross-member. Each support comprises a hole delimited by a stop surface, the second cross-member always being separated from each stop surface by a clearance. A median supporting member is arranged transversely between the two supports and above the second cross-member.

11 Claims, 3 Drawing Sheets

(56) References Cited

U.S. PATENT DOCUMENTS

| | | | |
|---|---|---|---|
| 4,645,143 A * | 2/1987 | Coffy | B64C 25/52 244/108 |
| 5,860,621 A | 1/1999 | Barquet et al. | |
| 6,244,538 B1 | 6/2001 | Howard et al. | |
| 7,770,843 B2 * | 8/2010 | Bietenhader | B64C 25/52 244/108 |
| 8,979,024 B2 * | 3/2015 | Piccone | B64C 25/52 244/108 |
| 9,085,356 B2 * | 7/2015 | Prudhomme-Lacroix | B64C 25/52 |
| 9,085,361 B2 * | 7/2015 | Prud'Homme-Lacroix | B64C 25/52 |
| 9,315,262 B2 * | 4/2016 | Prud'Homme-Lacroix | B64C 25/52 |
| 2007/0181744 A1 | 8/2007 | Bietenhader | |
| 2012/0080560 A1 | 4/2012 | Piccone et al. | |
| 2014/0084109 A1 | 3/2014 | Prud Homme-Lacroix | |
| 2015/0151836 A1 | 6/2015 | Prud Homme-Lacroix et al. | |
| 2016/0167773 A1 | 6/2016 | Cranga | |

FOREIGN PATENT DOCUMENTS

| | | |
|---|---|---|
| FR | 2749561 A1 | 12/1997 |
| FR | 2895368 B1 | 7/2009 |
| FR | 2965546 A1 | 4/2012 |
| FR | 2995874 A1 | 3/2014 |
| FR | 3014079 B1 | 1/2016 |
| FR | 3029891 B1 | 1/2017 |

* cited by examiner

ROTORCRAFT PROVIDED WITH AN AIRFRAME CARRIED BY A SKID LANDING GEAR WITH ZONES FOR TAKING UP VARIABLE FORCES

CROSS-REFERENCE TO RELATED APPLICATIONS

This application claims priority to French patent application No. FR 23 03075 filed on Mar. 30, 2023, the disclosure of which is incorporated in its entirety by reference herein.

TECHNICAL FIELD

The present disclosure relates to a rotorcraft provided with an airframe carried by a skid landing gear with zones for taking up variable forces. More precisely, the disclosure lies in the technical field of rotorcraft skid landing gears.

BACKGROUND

Conventionally, a rotorcraft comprises a landing gear upon which an airframe of the rotorcraft rests on the ground. More particularly, a landing gear referred to as a "skid landing gear" is provided with a first longitudinal support skid and a second longitudinal support skid. The skids are intended to be in contact with the ground.

In order to link each skid to the airframe of the rotorcraft, a skid landing gear may be provided with a first cross-member and a second cross-member each linking the first skid to the second skid.

Moreover, a rotorcraft comprising a lift rotor carrying at least three articulated blades is likely to be subject to ground resonance.

Indeed, the oscillations of each blade about its drag axis can combine in an unstable manner with the movements of the airframe of the rotorcraft according to the elastic deformation modes of the landing gear, in particular in relation to roll. This is what gives rise to "ground resonance".

As they rotate, the blades are moved out of their stable position in the plane of rotation of the rotor, and may be distributed at unequal angles about the axis of rotation of the rotor. This unequal distribution gives rise to imbalance due to the center of gravity of the rotor being moved away from the axis of rotation of the rotor. Furthermore, the blades, when moved out of their stable position, oscillate around this stable position at an oscillation frequency FPP that is the natural drag frequency of the blades. The airframe of the rotorcraft is then excited at excitation frequencies equal to the absolute value of the frequency of rotation of the rotor plus or minus the oscillation frequency FPP.

There is a risk of instability on the ground when the natural roll or pitch frequency of the fuselage on its landing gear is close to an excitation frequency, that corresponds to the phenomenon known as ground resonance. In practice, roll instability can occur if the natural roll frequency of the fuselage on its landing gear is close to the absolute value of the frequency of rotation of the rotor minus the oscillation frequency FPP.

In order to avoid instability, seeking to prevent these frequencies from interacting by adapting the roll and/or pitch stiffness of the landing gear is particularly known. However, adapting landing gears can be complex. In particular, a compromise needs to be found between the vertical stiffness of the landing gear, that manages comfort and the level of load introduced into the airframe during landing, and the pitch and roll stiffnesses, that have a major influence on ground resonance behavior.

It should be noted that "vertical stiffness" is used by a person skilled in the art to refer to the stiffness of the landing gear under the effect of gravity (or any other vertical load) along the elevation axis of the rotorcraft, to the nearest static attitude.

Moreover, the landing gear is connected to the airframe of the rotorcraft by fastenings connecting the front and rear cross-members to the airframe.

A conventional skid landing gear comprises two fastenings on one cross-member and one central fastening on the other cross-member. Such a landing gear may be described as a "landing gear with three fastening points". A landing gear with three fastening points has the advantage of lowering the natural roll frequency of the airframe resting on the landing gear, that may tend to limit the risks of ground resonance occurring. However, the airframe needs to be reinforced in order to withstand the forces introduced during a hard landing at a single point by the cross-member fastened to the airframe by a single fastening.

Another conventional skid landing gear comprises two fastenings per cross-member and may be described as a "landing gear with four fastening points". Such a landing gear is advantageous because it allows the forces that are sustained in the event of a hard landing to be distributed into two spars of the airframe. However, the natural roll frequency of the airframe resting on the landing gear is also increased.

Designing a skid landing gear is therefore a challenging operation.

Various landing gears are known for preventing the occurrence of ground resonance, in particular.

Document FR 2 749 561 A1 describes a skid landing gear with three fastening points.

Document FR 2 554 210 A1 has a flexible beam made from composite materials that is substantially in the form of an elongated box with a laminated structure. Two rigid flanges are linked by two webs. A deformable energy-absorbing insert is arranged between the two flanges, and comprises at least one block made from an elastomeric material with high deformation remanence. The beam also comprises at least one viscoelastic damper mounted on the outer face of the flange. This damper is loaded in tension by connecting rods when the beam is subjected to bending, adding to the damping provided by each energy-absorbing insert.

Document U.S. Pat. No. 4,270,711 discloses a landing gear provided with a beam linked by a pivot to a cross-member of the landing gear so as to be able to rotate about an axis.

Document U.S. Pat. No. 6,244,538 discloses a cross-member that cooperates with two pivot fastenings.

Document U.S. Pat. No. 3,173,632 discloses a landing gear provided with two skids linked by two torsion rods.

Document FR 2 895 368 B1 discloses a rotorcraft provided with a front cross-member that has four front links to be linked to an airframe, and a rear cross-member that has a single central fastening. The four front links comprise two first active link means for transmitting forces between the front cross-member and the airframe when the front cross-member undergoes a deformation that is less than a predetermined roll or vertical sink deformation, and two second active link means for transmitting forces when the cross-member undergoes a deformation that reaches or exceeds the predetermined deformation.

Document FR 2 965 546 A1 describes an aircraft comprising a landing gear that adapts to the slope of the ground.

Documents FR 2 995 874 A1, FR 3 014 079 B1 and FR 3 029 891 B1 are also known. Document CN 106 347 638 A is also known and describes a skid landing gear for a drone.

SUMMARY

An object of the present disclosure is thus to propose a rotorcraft provided with an innovative landing gear for limiting the risks of ground resonance occurring and for structurally optimizing the airframe.

The disclosure therefore relates to a rotorcraft provided with a rotary wing and a skid landing gear, the landing gear being provided with a first skid and a second skid as well as a first cross-member and a second cross-member each linking the first skid to the second skid, the first cross-member and the second cross-member each having a first descending branch secured to the first skid and a second descending branch secured to the second skid and a central branch linking the first branch to the second branch, the first cross-member being connected to an airframe of the rotorcraft only by two fastenings.

The two fastenings may be connected to two respective spars of the airframe.

The second cross-member is only carried during flight by two supports fastened to the airframe, the two supports being traversed by the second cross-member, each support comprising a hole delimited by a stop surface of this support, the second cross-member always being separated from each stop surface by a clearance, said airframe carrying a median supporting member arranged transversely between the two supports and above the second cross-member when the rotorcraft is resting on horizontal ground, the second cross-member bearing against the median supporting member and said clearances being present above the second cross-member when the rotorcraft is resting on the ground and in the absence of vertical acceleration and plastic deformation of the second cross-member.

The expression "said clearances being present above the second cross-member when the rotorcraft is resting on the ground and in the absence of vertical acceleration and plastic deformation of the second cross-member" means that, when the rotorcraft is resting on the ground and in the absence of rollover and deformations, a space is situated above the second cross-member between this second cross-member and each stop surface as seen by an observer.

Therefore, when on the ground and in normal landing conditions, the landing gear behaves like a landing gear with three fastening points during a first operating phase. The forces are transmitted between the landing gear and the airframe via the two fastenings for the first cross-member, and via the median supporting member for the second cross-member. Indeed, the supports are dimensioned to have a clearance above the second cross-member in these conditions, in order to prevent forces from being transmitted. As a result, the natural roll frequency of the airframe on its landing gear is minimized, that can tend to improve the behavior of the rotorcraft from a ground resonance point of view.

Moreover, using a median supporting member that is only in contact with the top of the second cross-member during flight and that does not clamp the second cross-member, rather than a flange that clamps the cross-member, helps create a link between the second cross-member and the airframe that completely decouples the roll vibration mode of the airframe from the other vibration modes.

Furthermore, this transmission of forces via the median supporting member remains moderate under normal landing conditions. The median supporting member may therefore be fastened to a structure that does not need to be greatly reinforced.

During a hard landing, a second operating phase of the second cross-member is initiated. The second cross-member flexes, bending under the median supporting member, causing this second cross-member to come into contact with the tops of the stop surfaces of the supports. The forces are transmitted between the landing gear and the airframe via the two fastenings for the first cross-member, and via the two supports for the second cross-member. The supports are dimensioned to now have a clearance beneath the cross-member. The landing gear then behaves like a landing gear with four fastening points.

The considerable forces generated by the hard landing at the second cross-member are therefore transmitted to two different zones of the airframe, allowing its dimensions to be optimized. Furthermore, the second cross-member can be plastically deformed, allowing some of the kinetic energy of the airframe to be absorbed during landing.

The rotorcraft is therefore provided with a landing gear that has the advantages of a skid landing gear with three fastening points in normal conditions, and the advantages of a skid landing gear with four fastening points in more unfavorable conditions.

The rotorcraft may also comprise one or more of the following features, taken individually or in combination.

According to one possibility, the second cross-member having, in elevation, a lower part and an upper part, when the rotorcraft is resting on the ground and in the absence of vertical acceleration and plastic deformation of the second cross-member, the lower part rests on a bottom of the stop surface of each support while the clearance separates the upper part from a top of the stop surface of each support and the upper part bears against the median supporting member.

The expression "the second cross-member having, in elevation, a lower part and an upper part" means that, when the rotorcraft is resting on the ground, except in the event of rollover, the upper part is above the lower part as seen by an observer.

As a result, forces are transmitted only via the median supporting member between the second cross-member and the airframe.

Conversely, in the event of deformation greater than a threshold deformation and, for example, when plastic deformation occurs in the second cross-member, the lower part no longer rests on the bottoms of the stop surfaces of the supports, while the upper part bears against the top of the stop surface of each support. Moreover, the upper part no longer bears against the median supporting member.

According to one possibility compatible with the preceding possibilities, the second cross-member can introduce force into the airframe only via the median supporting member, when on the ground, as long as the second cross-member undergoes deformation lower than a limit deformation, the second cross-member introducing forces into the airframe only via the two supports when the second cross-member undergoes deformation greater than the limit deformation.

The limit deformation may be the start of plastic deformation of the second cross-member. The landing gear then behaves like a landing gear with four fastening points when the second cross-member is deformed plastically, and like a landing gear with three fastening points when the second cross-member is deformed elastically.

According to one possibility compatible with the preceding possibilities, each support may comprise a reinforcement carrying a lining, the lining comprising the stop surface of this support.

For example, the lining prevents metal-on-metal contact between the support and the cross-member. Such a lining is not made from metal, for example, and may be made from an elastomer.

Said reinforcement may possibly comprise a U-shaped half clamp secured to the airframe. Such a half clamp is relatively simple and allows the second cross-member to be enclosed while providing the required clearance.

According to one possibility compatible with the preceding possibilities, said median supporting member may comprise a base secured to the airframe, the base carrying an insert, the second cross-member bearing against the insert when the rotorcraft is resting on the ground and in the absence of vertical acceleration and plastic deformation of the second cross-member.

For example, the insert is defined to prevent metal-on-metal contact between the support and the cross-member. Such an insert is not made from metal, for example, and may be made from an elastomer.

The insert may comprise a planar face in contact with the second cross-member. Alternatively, the insert may comprise a face in contact with the second cross-member that is shaped to conform to a shape of the second cross-member, for example extending along an arc of a circle.

According to one possibility compatible with the preceding possibilities, the two holes of the two supports may have an oblong shape in two respective longitudinal-vertical planes, said second cross-member having circular sections in said longitudinal-vertical planes in the absence of deformation.

For example, each longitudinal-vertical plane is parallel to both a yaw axis and a roll axis of the rotorcraft.

The oblong shape of the holes gives the second cross-member with circular sections freedom of movement in elevation.

According to one possibility compatible with the preceding possibilities, the two supports may be fastened respectively to two spars of the airframe, the two fastenings being fastened respectively to the two spars, the median supporting member being fastened to a structure extending from one spar to the other spar.

The framework of the rotorcraft may therefore comprise two spars carrying the two supports and the two fastenings to take up the forces during a hard landing. Each spar may comprise one or more beams. Another beam or a frame may carry the median supporting member.

According to one possibility compatible with the preceding possibilities, the two supports comprising a first support and a second support, said central branch of the second cross-member may carry a first stop member and a second stop member configured to limit, by shape interference with the first support and the second support respectively, the freedom of movement of the second cross-member in relation to the airframe in a direction leading from the first support towards the second support.

As the two supports and the median supporting member do not clamp the second cross-member, the two stop members limit the freedom of movement of the second cross-member in a transverse direction. Each stop member may, for example, comprise a skid fastened by a screw/nut system to the central branch of the second cross-member. Each stop member may be positioned between the two supports.

According to one possibility compatible with the preceding possibilities, when the first stop member touches the first support, the second stop member is not in contact with the second support and, when the second stop member touches the second support, the first stop member is not in contact with the first support.

This architecture avoids the need to always have a stop member in contact with any support.

According to one possibility compatible with the preceding possibilities, said median supporting member may extend at an equal distance from the two supports.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Three directions X, Y, and Z orthogonal to each other are shown in the figures.

The first direction X is referred to as the longitudinal direction and is parallel to the roll axis of the rotorcraft shown. The term "longitudinal" is relative to any direction parallel to the first direction X.

The second direction Y is referred to as the transverse direction and is parallel to the pitch axis of the rotorcraft shown. The term "transverse" is relative to any direction parallel to the second direction Y.

Finally, the third direction Z is referred to as the direction in elevation and is parallel to the yaw axis of the rotorcraft shown. The expression "in elevation" is relative to any direction parallel to the third direction Z.

Figure 1:
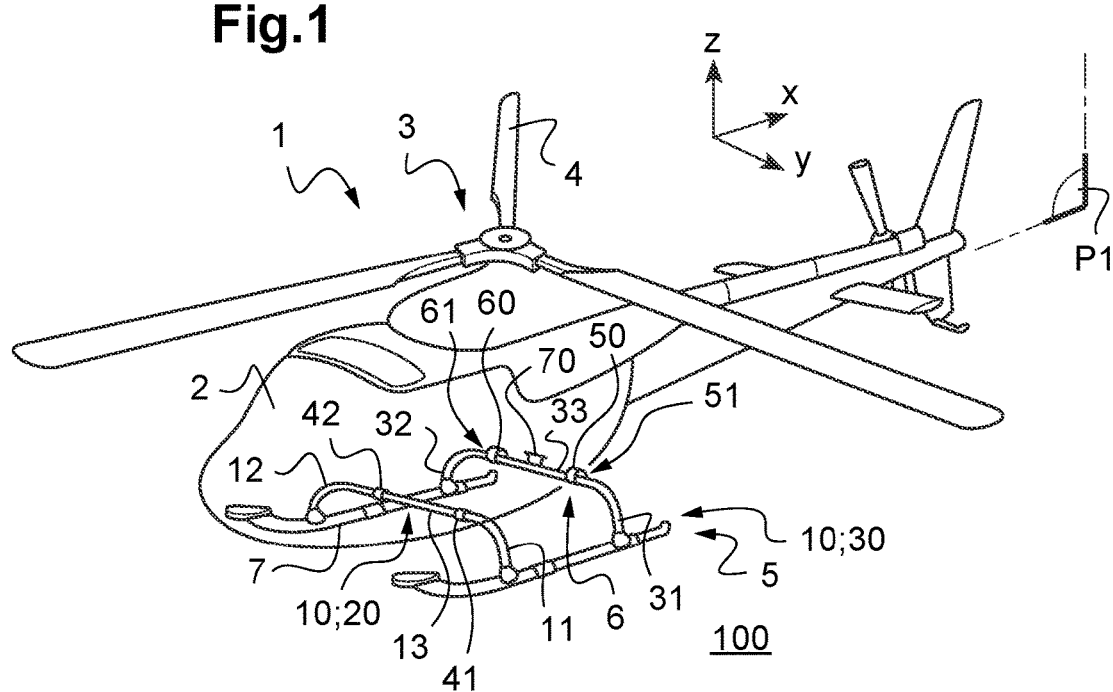
FIG. 1 is a simplified perspective view of a rotorcraft according to the disclosure.

FIG. 1 shows a rotorcraft 1. The rotorcraft 1 comprises a rotary wing 3 carried by an airframe 2. The rotary wing 3 may comprise at least three blades 4, each blade 4 being movable, in particular in a drag direction, in relation to a hub.

The airframe 2 extends longitudinally along a plane of symmetry P1. Moreover, the airframe 2 rests on a skid landing gear 5. In particular, the landing gear 5 is attached to a framework of the airframe 2.

It should be noted that a portion of the airframe 2 has been rendered transparent in FIG. 1 in order to show the landing gear 5.

This landing gear 5 comprises a first skid 6 and a second skid 7. The first skid 6 and the second skid 7 form a plane likely to rest on flat ground 100.

Therefore, the landing gear 5 comprises two transverse cross-members 10 linking the first skid 6 and the second skid 7, i.e., a first cross-member 20 and a second cross-member 30. Reference number 10 is used pour refer to any cross-member, reference numbers 20 and 30 being used if necessary to refer individually to a specific cross-member.

The first cross-member 20 possibly forms a front cross-member and the second cross-member 30 forms a rear cross-member, the terms "front" and "rear" being conventionally used by a person skilled in the art and being considered in a direction of forward travel of the rotorcraft 1.

FIG. 1 shows a rotorcraft 1 having two skids 6, 7 that each extend from a free rear end to a free front end, each cross-member 10 being connected between the front and rear ends of each skid 6, 7. Other embodiments are possible, as shown in patent FR 2 749 561, for example.

Each cross-member 20, 30 is provided with a first branch 11, 31 that is secured in a conventional manner to the first skid 6, and a second branch 12, 32 secured in a conventional manner to the second skid 7.

Moreover, each cross-member 20, 30 shown in the diagram is continuous, comprising a central branch 13, 33 extending from the first descending branch 11, 31 to the second descending branch 12, 32. The branches 11, 12, 31, 32 are sometimes referred to as "descending branches" insofar as these branches 11, 12, 31, 32 extend towards the ground from the central branch 13, 33 in question towards a skid 6, 7 when the rotorcraft 1 is on the ground. Therefore, the first cross-member 20 successively comprises a first primary descending branch 11, a primary central branch 13 and a second primary descending branch 12. Similarly, the second cross-member 30 successively comprises a first secondary descending branch 31, a secondary central branch 33 and a second secondary descending branch 32.

On flat ground, each cross-member 20, 30 and, in particular, each central branch 13, 33 may be broken down into an upper part and a lower part as seen by an observer. The lower part and the upper part may, for example, meet halfway up the cross-member.

Moreover, each cross-member 10 is fastened to the airframe 2.

Therefore, the first cross-member 20 is connected to the airframe 2 of the rotorcraft 1 only by two fastenings 41, 42. Each fastening 41, 42 surrounds the first cross-member 20 without clearance and is secured to the framework of the airframe 2. For example, the two fastenings 41, 42 are fastened to two respective spars of the airframe 2. According to one example, each fastening 41, 42 comprises a half clamp fastened to a load-bearing member the framework, and for example a spar, the half clamp clamping a two-part lining surrounding the first cross-member 20 without clearance.

Figure 2:
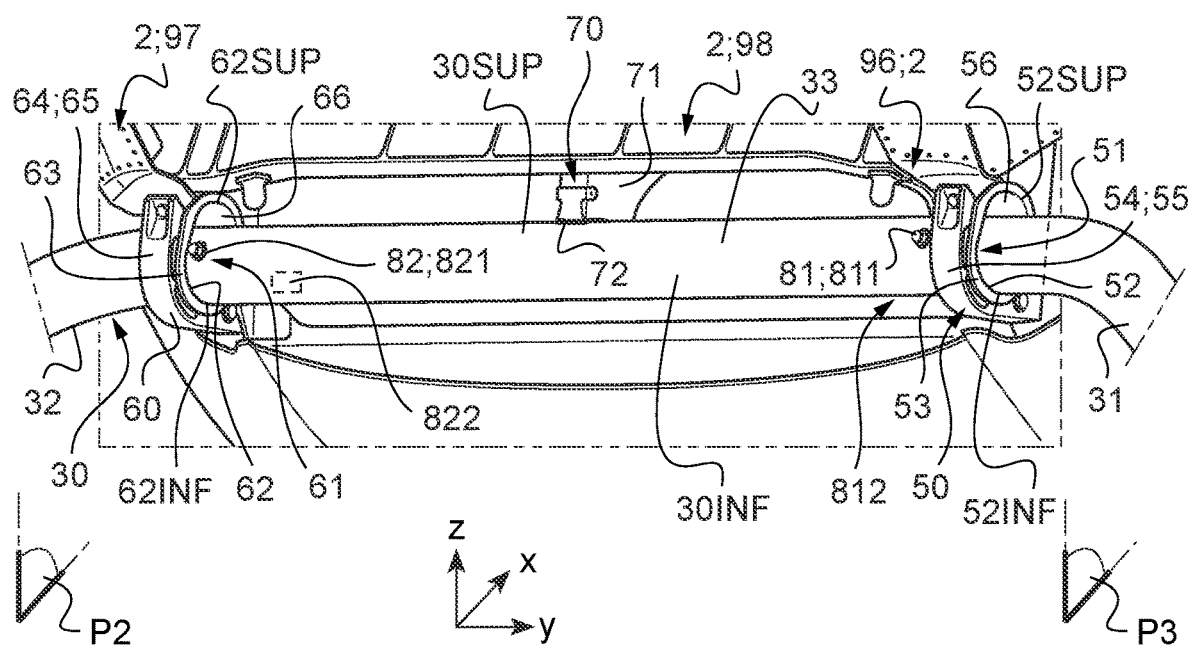
FIG. 2 is a perspective view of the second cross-member of a landing gear according to the disclosure.

In reference to FIG. 2, the second cross-member 30 is only carried during flight, i.e., when the skids 6, 7 are no longer touching the ground, by a first support 50 and a second support 60. The first support 50 and the second support 60 are referred to more simply as "support".

The two supports 50, 60 are secured to the airframe 2 and, in particular, to its framework. For example, the first support 50 and the second support 60 are secured respectively to a first spar 96 of the airframe 2 and a second spar 97 of the airframe 2. The first spar 96 is possibly also secured to one fastening 41 while the second spar 97 is secured to the other fastening 42.

The first support 50 and the second support 60 are fully traversed by the second cross-member 30 in a transverse direction DIR leading from the first support 50 to the second support 60. In particular, the first support 50 and the second support 60 are traversed by the central branch 33 of the second cross-member 30.

To this end, the first support 50 and the second support 60 respectively have two holes, i.e., a first hole 51 and a second hole 61 respectively. The first hole 51 and the second hole 61 are traversed transversely by the second cross-member 30. The two holes 51, 61 may respectively be delimited, radially around the transverse direction DIR, by two stop surfaces 52, 62. Therefore, the first hole 51 may be delimited radially in relation to the transverse direction DIR by a first stop surface 52 of the first support 50. Similarly, the second hole 61 may be delimited radially in relation to the transverse direction DIR by a second stop surface 62 of the second support 60.

For example, the first support 50 comprises a reinforcement referred to as the "first reinforcement 54". The first reinforcement 54 carries a lining referred to as the "first lining 53" that extends along a closed line. Therefore, the first stop surface 52 is an inner face of the first lining 53 that radially surrounds the first hole 51. According to the example shown, the first reinforcement 54 comprises a U-shaped half clamp 55 secured to the airframe 2, for example directly or via a connection piece to the first spar 96.

For example, the second support 60 comprises a reinforcement referred to as the "second reinforcement 64". The second reinforcement 64 carries a lining referred to as the "second lining 63" that extends along a closed line. Therefore, the second stop surface 62 is an inner face of the second lining 63 that radially surrounds the second hole 61. According to the example shown, the second reinforcement 64 comprises a U-shaped half clamp 65 secured to the airframe 2, for example directly or via a connection piece to the second spar 97.

In order to limit the freedom of translational movement of the second cross-member 30 in relation to the airframe 2 in the transverse direction DIR, the central branch 33 may carry a first stop member 81 and a second stop member 82. The first stop member 81 and the second stop member 82 are, for example, arranged transversely between the first support 50 and the second support 60. The purpose of the first stop member 81 and the second stop member 82 is to limit the transverse movement of the second cross-member 30 in relation to the airframe 2, by shape interference with the first support 50 and the second support 60 respectively.

For example, the first stop member 81 comprises a screw/nut system 811 that passes through the second cross-member 30 to secure a first insert 812 to this second cross-member 30. Similarly, the second stop member 82 comprises a screw/nut system 821 that passes through the second cross-member 30 to secure a second insert 822 to this second cross-member 30. The first insert 812 and the second insert 822 are concealed in FIG. 2 and shown in FIG. 3.

Figure 3:
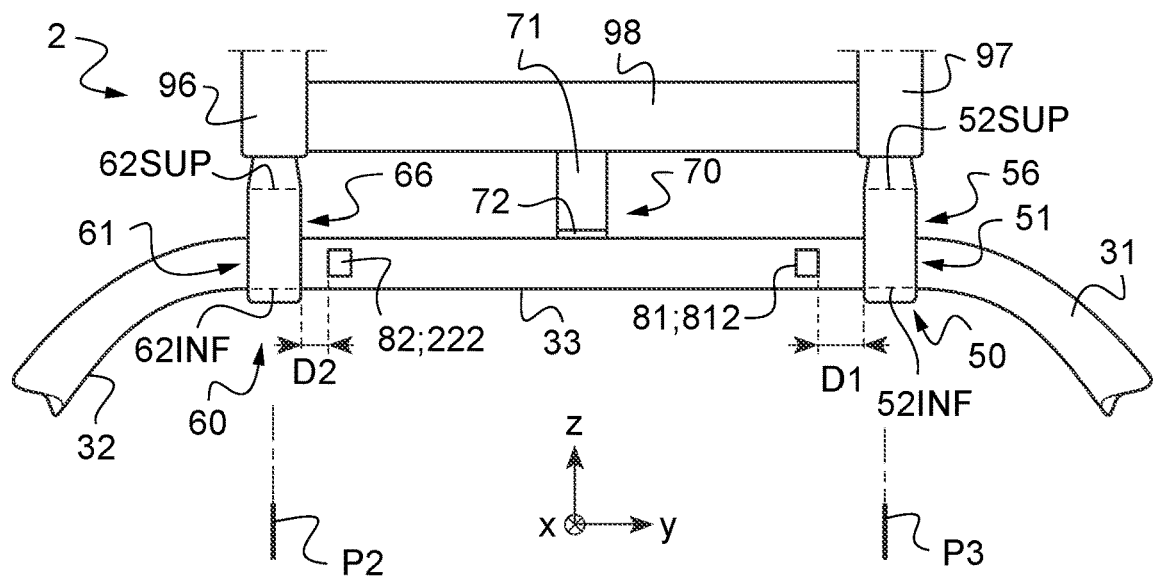
FIG. 3 is a longitudinal view of the second cross-member of a landing gear according to the disclosure.

In reference to FIG. 3, a first distance D1 represents the smallest distance between the first stop member 81, or indeed its first insert 812, and the first support 50. Similarly, a second distance D2 represents the smallest distance between the second stop member 82, or indeed its second insert 822, and the second support 60. Therefore, the first distance D1 may be different to the second distance D2 when a stop member is touching the corresponding support. The first distance D1 and the second distance D2 are never zero simultaneously.

Irrespective of this aspect, and once more in reference to FIG. 2, the second cross-member 30 always has a clearance 56, 66 with the two stop surfaces 52, 62, i.e., a first clearance 56 with the first stop surface 52 and a second clearance 66 with the second stop surface 62. Therefore, an empty space always separates the second cross-member 30 in elevation from a bottom 52INT and/or a top 52SUP of the first stop surface 52, and an empty space always separates the second cross-member 30 in elevation from a bottom 62INT and/or a top 62SUP of the second stop surface 62. The top of a stop surface 52, 62 is actually situated above the bottom of this stop surface 52, 62 when the rotorcraft 1 is resting on flat ground 100 and as seen by an individual on that ground 100.

In order to have the required clearances 56, 66, the two holes 51, 61 of the two supports 50, 60 may be in the form of oblongs in two respective longitudinal-vertical planes P2, P3. Conversely, the second cross-member 30 may have circular sections in these longitudinal-vertical planes P2, P3 in the absence of deformation. The second cross-member 30 therefore has freedom of translational movement in relation to the two supports 50, 60 along axes that may be vertical when the rotorcraft 1 is resting on horizontal ground 100.

Moreover, the airframe 2 carries a median supporting member 70. This median supporting member 70 is arranged transversely according to the transverse direction DIR between the first support 50 and the second support 60. Furthermore, when the rotorcraft 1 is resting on horizontal ground 100, this median supporting member 70 is arranged above the second cross-member 30, as seen by an individual on the ground.

This median supporting member 70 may extend transversely at an equal distance from the first support 50 and the second support 60, for example in the plane of symmetry P1.

This median supporting member 70 may comprise a base 71 secured to the airframe 2, and, for example, to a structure 98 extending from the first spar 96 to the second spar 97 referred to above. The base 71 may be fastened to this structure 98 in a conventional manner, for example by screwing and/or riveting means.

The base 71 may possibly carry an insert 72.

In these conditions and as shown in FIG. 2, (a) during flight or (b) when the rotorcraft 1 is resting on the ground 100 and in the absence of vertical acceleration and plastic deformation of the second cross-member, the second cross-member 30 bears against the median supporting member 70 situated above this second cross-member 30. Moreover, two clearances 56, 66 are present above the second cross-member 30 within the two supports. Indeed, the lower part 30INF of the second cross-member rests on a bottom 52INF, 62INF of the stop surface 52, 62 of each support 50, 60 whereas a clearance 56, 66 separates the upper part 30SUP of the second cross-member from a top 52SUP, 62SUP of the stop surface 52, 62 of each support 50, 60.

FIGS. 4 to 8 show the operation of the disclosure.

Figure 4:
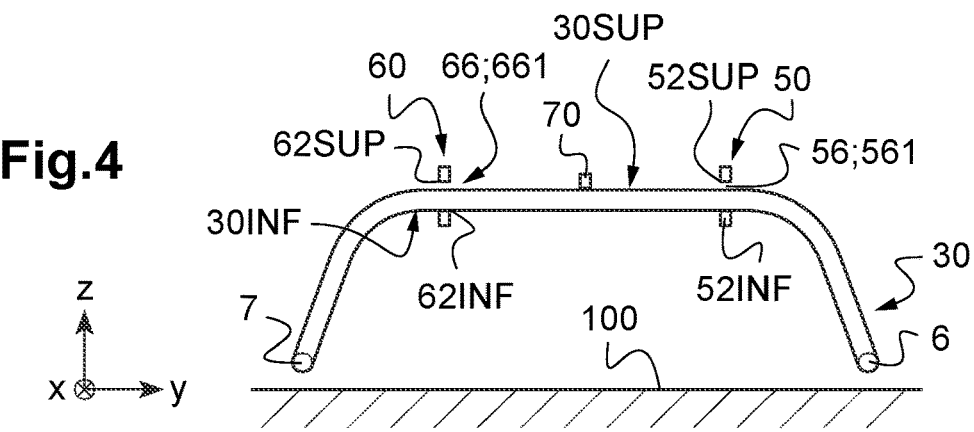
FIG. 4 is a longitudinal view of the second cross-member of a landing gear according to the disclosure during flight.

FIG. 4 shows the second cross-member 30 during flight. In these conditions, the median supporting member 70 and, if applicable, the insert 72, rests on the upper part 30SUP of the second cross-member 30. Furthermore, clearances 561, 661 are present in the two supports 50, 60 above the second cross-member 30. Due to gravity, the lower part 30INF of the second cross-member 30 rests on the bottoms 52INF, 62INF of the first stop surface 52 and the second stop surface 62. The second cross-member 30 is suspended under the airframe 2, nevertheless being in contact with the median supporting member 70.

During a first operating phase that takes place when landing on the ground 100 or when resting on the ground 100, the median supporting member 70 applies a force to the second cross-member 30 substantially at the center of its central branch 33. The central branch 33 flexes. Therefore, a lower clearance 562, 662 may separate the second cross-member 30 and the bottom 52INF, 62INF of each stop surface 52, 62, and an upper clearance 561, 661 may separate the second cross-member 30 and the top 52SUP, 62SUP of each stop surface 52, 62.

The landing gear 5 thus behaves like a landing gear with three fastening points. Furthermore, using a median supporting member 70 allows the roll vibration mode of the airframe 2 to be decoupled from its landing gear 5.

Figure 5:
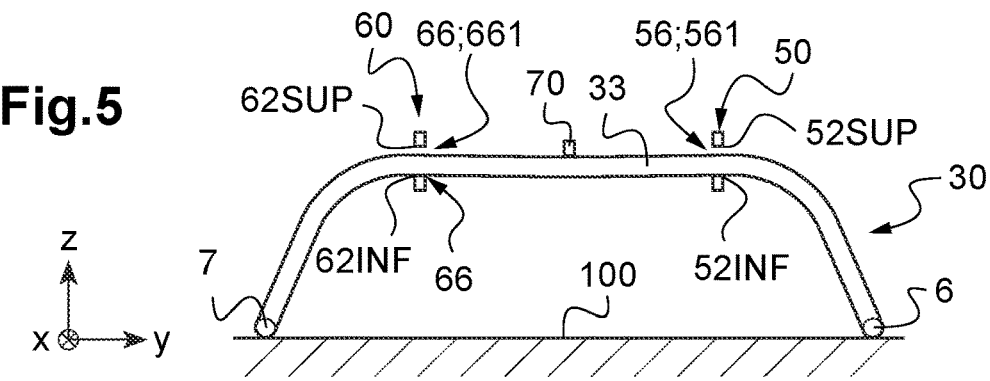
FIG. 5 is a longitudinal view of the second cross-member of a landing gear according to the disclosure, operating according to a first operating phase, in a rotorcraft having a minimum mass.
Figure 6:
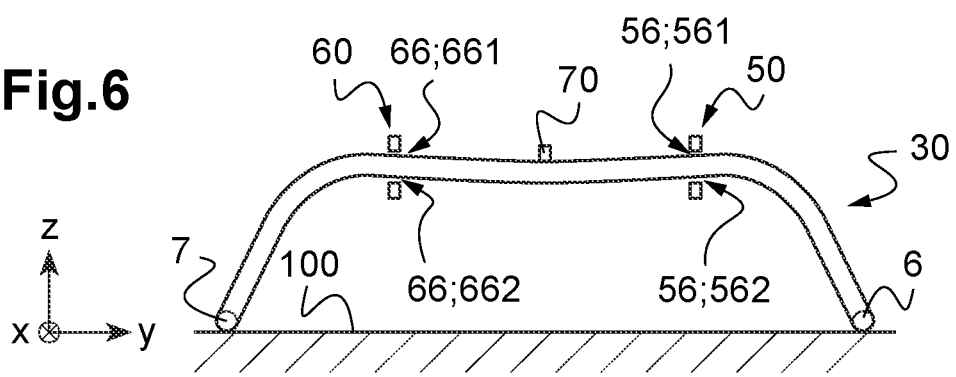
FIG. 6 is a longitudinal view of the second cross-member of a landing gear according to the disclosure, operating according to a first operating phase, in a rotorcraft having a maximum mass.

FIG. 5 shows a rotorcraft 1 resting on the ground but with a minimum mass, whereas FIG. 6 shows a rotorcraft 1 resting on the ground but with a maximum mass.

In these conditions, the second cross-member 30 introduces a force into the airframe 2 only via the median supporting member 70 as long as the second cross-member 30 undergoes deformation lower than a limit deformation.

Figure 7:
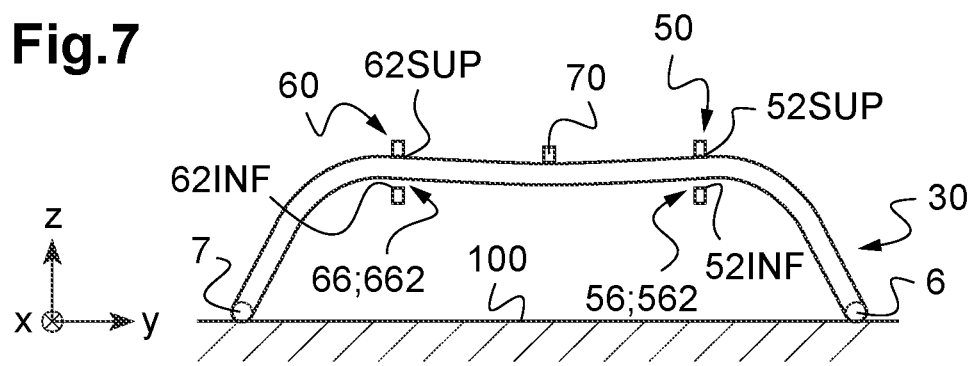
FIG. 7 is a longitudinal view of the second cross-member of a landing gear according to the disclosure, during a transition between the first operating phase and a second operating phase.

Conversely, during a hard landing and in reference to FIG. 7, the second cross-member 30 continues to flex and enters a second operating phase. The switch from the first operating phase to the second operating phase takes place when the deformation of the second cross-member exceeds the limit deformation, and may, for example, correspond to the transition from a deformation phase in the elastic range of the second cross-member to a deformation in the plastic range of the second cross-member.

The second cross-member 30 then bears not only against the median supporting member 70 but also against the tops 52SUP, 62SUP of the stop surfaces 52, 62.

Figure 8:
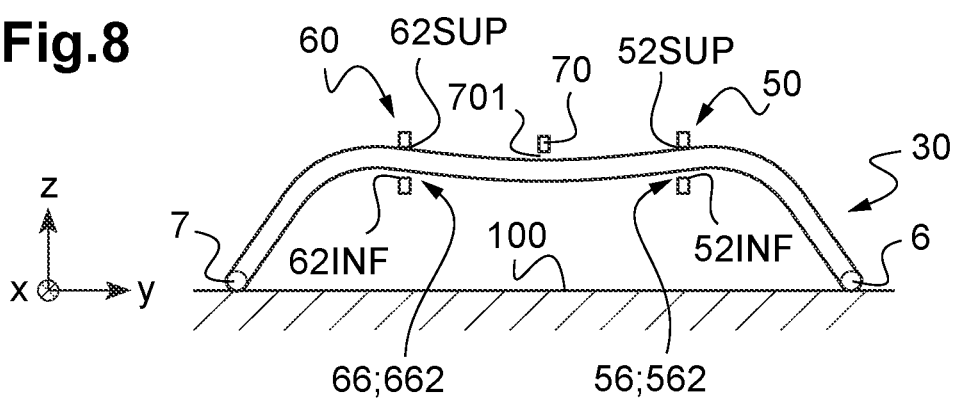
FIG. 8 is a longitudinal view of the second cross-member of a landing gear according to the disclosure, operating according to a second operating phase.

If the deformation continues, and in reference to FIG. 8, the second cross-member 30 moves away from the median supporting member 70 but remains in contact with the tops 52SUP, 62SUP of the stop surfaces 52, 62. The landing gear 5 then behaves like a landing gear with four fastening points. If required, the second cross-member 30 continues to flex and deform plastically so as to absorb some of the energy resulting from the landing. As a result, the second cross-member 30 introduces forces into the airframe 2 only via the two supports 50, 60 when the second cross-member 30 undergoes deformation greater than the limit deformation.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A rotorcraft provided with a rotary wing and a skid landing gear, the landing gear being provided with a first skid and a second skid as well as a first cross-member and a second cross-member each linking the first skid to the second skid, the first cross-member and the second cross-member each having a first descending branch secured to the first skid and a second descending branch secured to the second skid and a central branch linking the first branch to the second branch, the first cross-member being connected to an airframe of the rotorcraft only by two fastenings, wherein the second cross-member is only carried during flight by two supports fastened to the airframe, the two supports being traversed by the second cross-member, each support comprising a hole delimited by a stop surface of this support, the second cross-member always being separated from each stop surface by a clearance, the airframe carrying a median supporting member arranged transversely between the two supports and above the second cross-member when the rotorcraft is resting on horizontal ground, the second cross-member bearing against the median supporting member and the clearances being present above the second cross-member when the rotorcraft is resting on the ground and in the absence of vertical acceleration and plastic deformation of the second cross-member.

2. The rotorcraft according to claim 1, wherein, the second cross-member having, in elevation, a lower part and an upper part, when the rotorcraft is resting on the ground and in the absence of vertical acceleration and plastic deformation of the second cross-member, the lower part rests on a bottom of the stop surface of each support while the clearance separates the upper part from a top of the stop surface of each support and the upper part bears against the median supporting member.

3. The rotorcraft according to claim 1, wherein the second cross-member introduces force into the airframe only via the median supporting member, when on the ground, as long as the second cross-member undergoes deformation lower than a limit deformation, the second cross-member introducing forces into the airframe only via the two supports when the second cross-member undergoes deformation greater than the limit deformation.

4. The rotorcraft according to claim 1, wherein each support comprises a reinforcement carrying a lining, the lining comprising the stop surface of this support.

5. The rotorcraft according to claim 4, wherein the reinforcement comprises a U-shaped half clamp secured to the airframe.

6. The rotorcraft according to claim 1, wherein the median supporting member comprises a base secured to the airframe, the base carrying an insert, the second cross-member bearing against the insert when the rotorcraft is resting on the ground and in the absence of vertical acceleration and plastic deformation of the second cross-member.

7. The rotorcraft according to claim 1, wherein the two holes of the two supports have an oblong shape in two respective longitudinal-vertical planes, the second cross-member having circular sections in the longitudinal-vertical planes in the absence of deformation.

8. The rotorcraft according to claim 1, wherein the two supports are fastened respectively to two spars of the airframe, the two fastenings being fastened respectively to the two spars, the median supporting member being fastened to a structure extending from one spar to the other spar.

9. The rotorcraft according to claim 1, wherein, the two supports comprising a first support and a second support, the central branch of the second cross-member carries a first stop member and a second stop member configured to limit the freedom of movement of the second cross-member in relation to the airframe in a direction leading from the first support to the second support, by shape interference with the first support and the second support respectively.

10. The rotorcraft according to claim 9, wherein, when the first stop member touches the first support, the second stop member is not in contact with the second support, and when the second stop member touches the second support, the first stop member is not in contact with the first support.

11. The rotorcraft according to claim 1, wherein the median supporting member extends at an equal distance from the two supports.

* * * * *